United States Patent
Graham et al.

(10) Patent No.: US 12,374,007 B2
(45) Date of Patent: Jul. 29, 2025

(54) USER INTERFACE FOR AND METHOD OF PRESENTING RAW IMAGE DATA WITH COMPOSITE IMAGE

(71) Applicant: Oliver Crispin Robotics Limited, Altrincham (GB)

(72) Inventors: Andrew Crispin Graham, Badminton (GB); Julian Matthew Foxall, Bristol (GB)

(73) Assignee: Oliver Crispin Robotics Limited, Altrincham (GB)

(*) Notice: Subject to any disclaimer, the term of this patent is extended or adjusted under 35 U.S.C. 154(b) by 654 days.

(21) Appl. No.: 17/548,884

(22) Filed: Dec. 13, 2021

(65) Prior Publication Data

US 2023/0186533 A1    Jun. 15, 2023

(51) Int. Cl.
| | |
|---|---|
| *G06T 11/60* | (2006.01) |
| *G06T 3/4038* | (2024.01) |
| *G06T 5/50* | (2006.01) |

(52) U.S. Cl.
CPC ............ *G06T 11/60* (2013.01); *G06T 3/4038* (2013.01); *G06T 5/50* (2013.01); *G06T 2207/20104* (2013.01)

(58) Field of Classification Search
CPC ........................ G06T 11/60; G06T 5/50; G06T 2207/20104; G06T 2207/20092;
(Continued)

(56) References Cited

U.S. PATENT DOCUMENTS

| | | |
|---|---|---|
| 9,171,384 B2 | 10/2015 | Forutanpour et al. |
| 10,679,948 B2 | 6/2020 | Ogawa et al. |

(Continued)

FOREIGN PATENT DOCUMENTS

| | | |
|---|---|---|
| EP | 3449861 | 3/2019 |
| EP | 3584637 A1 | 12/2019 |
| WO | 2013070375 | 5/2013 |
| WO | WO2016/077653 A1 | 5/2016 |
| WO | 2019143754 | 7/2019 |

OTHER PUBLICATIONS

Hoey et al. "Photosynth Walk Through"; https://www.youtube.com/watch?v=BHzw98qt5Lo; Published Jan. 12, 2008; Microsoft Live Labs (Year: 2008).*
Affinity Photo: "Panorama Source Image Mask Tools", Nov. 11, 2022 (Nov. 11, 2022), XP093047063, https://www.youtube.com/watch?v=KnuwwABKG3s; (2 pgs.).
(Continued)

*Primary Examiner* — Sumati Lefkowitz
*Assistant Examiner* — Michael Adam Shariff
(74) *Attorney, Agent, or Firm* — Fitch, Even, Tabin & Flannery LLP

(57) ABSTRACT

Methods and systems for presenting raw image data with a composite image are provided. For example, a method comprises displaying a composite image on a user interface; identifying an area of interest on the composite image; and displaying at least one source image on the user interface simultaneously with the composite image, the at least one source image containing at least one pixel in the area of interest. As another example, a method comprises projecting a composite image onto a representation of a three-dimensional (3D) surface displayed on a user interface to produce a 3D composite image and changing an orientation of the 3D composite image in response to a user input prior to identifying an area of interest on the 3D composite image. An image display system comprising a user interface is configured to simultaneously display the composite image and a plurality of source images.

20 Claims, 9 Drawing Sheets

(58) Field of Classification Search
CPC ..... G06T 3/4038; G06T 2200/24; G06T 7/13; G06V 10/25; G06V 10/16; G06F 3/04845
See application file for complete search history.

(56) References Cited

U.S. PATENT DOCUMENTS

| | | | |
|---|---|---|---|
| 10,758,198 B2 | 9/2020 | Wollowick | |
| 10,765,384 B2 | 9/2020 | Wollowick | |
| 10,823,877 B2 | 11/2020 | Petruk et al. | |
| 10,860,190 B1* | 12/2020 | Ditzler | G06F 3/0485 |
| 2015/0154805 A1 | 6/2015 | Hsu | |
| 2017/0219815 A1* | 8/2017 | Letter | F01D 21/003 |
| 2019/0049392 A1* | 2/2019 | Ruggiero | H04N 23/63 |
| 2019/0278249 A1 | 9/2019 | Clement et al. | |
| 2020/0352529 A1 | 11/2020 | Wollowick et al. | |

OTHER PUBLICATIONS

Aliakbar et al., Progressive Image Stitching Algorithm for Vision Based Automated Inspection, IEEE, 2016 International Conference on Machine Learning and Cybernetics (ICMLC), Jeju Korea, 2016, pp. 337-343. (Abstract Only) https://doi.org/10.1109/ICMLC.2016.7860924.

Liu et al., Optimal Image Stitching for Concrete Bridge Bottom Surfaces Aided by 3D Structure Lines, Semantic Scholar, International Archives of the Photogrammetry, Remote Sensing and Spatial Information Sciences, vol. XLI-B3, Prague Czech Republic, 2016, pp. 527-534.

Zhu et al., Panoramic Image Stitching for Arbitrarily Shaped Tunnel Lining Inspection, Computer-Aided Civil and Infrastructure Engineering, vol. 31, Issue 12, 2016, pp. 936-953.

* cited by examiner

USER INTERFACE FOR AND METHOD OF PRESENTING RAW IMAGE DATA WITH COMPOSITE IMAGE

FIELD

The present subject matter relates generally to user interfaces and, more particularly, to a user interface and a method for the presentation of raw image data with composite images.

BACKGROUND

Image stitching can be used to create a composite or stitched image of an object, such as an object under inspection. The composite or stitched image comprises many individual images taken synchronously or asynchronously, e.g., from one position with different view directions or from multiple viewpoints.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1A:
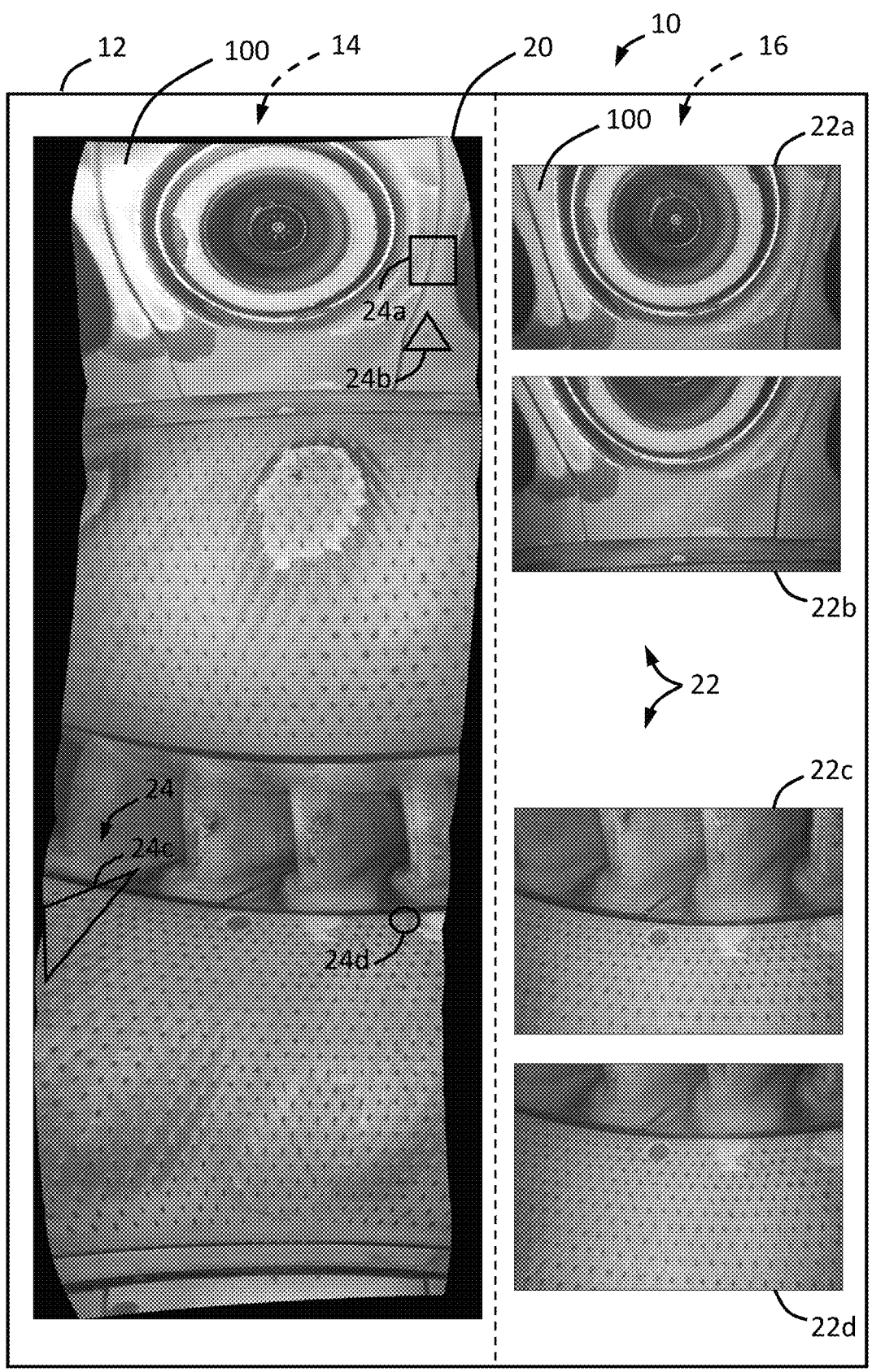
FIG. 1A provides a schematic view of a user interface of an image display system simultaneously displaying both a composite image and a plurality of source images.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, a composite image, which also may be referred to as a stitched image, is an image made from more than one original image by a process of distortion, scaling, linear alignment, rotary alignment, adjustment for lighting homogeneity, and/or numerical combination.

As used herein, a source image is a raw or original image used to form, make, or produce a composite image. The source image may be distorted, scaled, aligned (linearly or through rotation), adjusted for lighting homogeneity, and/or numerically combined to make the composite image.

As used herein, a pixel is a unit of programmable color in a digital image.

A risk with stitched images is that detail may be lost in the process of distortion, scaling, alignment (linear and rotary), adjustment for lighting homogeneity, and numerical combination, either through loss of resolution as images are re-sampled or through mis-alignment of overlapping or adjacent images, which can lead to a direct loss of detail through mis-alignment of pixels and cropping. Accordingly, the inventors of the present disclosure have found that improved composite image presentation that reduces or eliminates lost detail would be desirable.

Generally, the present subject matter provides a user interface and methods of presenting raw image data or source images with a composite image on a user interface. Often when forming a composite or stitched image from two or more source or original images, details in a source image may be lost in the composite image, or one or more discrepancies between a source image and the composite image may arise, through one or more processes, such as distortion, scaling, linear and rotary alignment, adjustment for lighting homogeneity, and adjustment for numerical combination, used to create the composite image. The present subject matter discloses identifying—and in at least some instances, providing visual cues to—the presence of differences in appearance between a composite image and the source images that produced the composite image. Further, the present subject matter discloses presenting the source images along with or simultaneously with the composite image to facilitate a user's review of the differences in appearance between the composite image and the source images. By identifying the differences between the composite image and the source images and presenting both the composite image and source images on the user interface, the present subject matter improves the quality of a user's inspection of an article using the composite image, as well as improves the speed and convenience of such inspection.

Referring now to the drawings, wherein identical numerals indicate the same elements throughout the figures, FIG. 1A provides a schematic view of an image display system 10. The image display system 10 includes a user interface 12 having a first section 14 displaying a composite image 20 and a second section 16 displaying at least one source image 22. As described herein, the composite image 20 is formed from two or more source images 22.

In various embodiments, the image display system 10 is configured to provide information to a human operator or user through the user interface 12. In some embodiments, the user interface 12 can include one or more screens. In other embodiments, the user interface 12 can include a projected field, comprising the first section 14 and second section 16, that is projected onto a surface such as a wall, floor, or the like. In still other embodiments, the user interface 12 can include a display of an augmented reality device, and the user may view the user interface 12 using a pair of augmented reality glasses.

The composite image 20 depicts an article 100, such as a component of a gas turbine engine, e.g., a rotor blade, a stator vane, a stage of rotor blades, a stage of stator vanes, a combustor liner, etc. The composite image 20, formed from a plurality of source images 22, may omit details, features, and/or defects of the article 100 that are shown in the source images 22 used to create the composite image 20. That is, in creating the composite image 20 to illustrate a greater extent of the article 100 than an individual source image 22, one or more details, features, and/or defects present in the article 100 may be obscured or omitted such that such details, features, and/or defects are not visible in the composite image 20. The image display system 10 facilitates identification of such differences or areas of poor image correspondence between the composite image 20 and the plurality of source images 22, e.g., to alert a user that one or more differences exist between the composite image 20 and one or more source images 22.

As shown in FIG. 1A, the image display system 10 identifies, points out, and/or gives a visual cue to a user of the differences between the composite image 20 and the source images 22. For example, the image display system 10 identifies at least one area of interest 24: one or more differences between the composite image 20 and one or more source images 22 occur in a respective area of interest 24. In at least some embodiments, identifying the one or more areas of interest 24 may include a signal to the image display system 10 that a given area of the composite image 20, which, e.g., may be measured in pixels, could contain a difference with respect to one or more source images 22. The signal may originate from a user's visual review of the composite image 20, after which the user gives an input received by the image display system 10 indicating an area of interest 24 has been found. User inputs are described in greater detail below. In other embodiments, the signal may originate from the image display system 10, e.g., upon execution of a program or other instructions to conduct a comparison or review of the composite image 20 and source images 22.

In some embodiments, after identifying the one or more areas of interest 24, the image display system 10 highlights the area(s) of interest 24 on the composite image 20. For example, as illustrated in FIG. 1A, more than one area of interest 24 may be highlighted on the composite image 20, e.g., if differences between the composite image 20 and the source images 22 occur in different locations of the composite image 20. For a composite image 20 having a plurality of areas of interest 24 highlighted thereon, the various areas of interest 24 may be denoted a first area of interest 24a, a second area of interest 24b, etc. Further, it will be appreciated that a first area of interest 24a may have one or more source images 22 in common with a second area of interest 24b and/or one or more source images 22 that differ from the source images 22 used within the second area of interest 24b.

Highlighting an area of interest 24 draws the user's attention to the potential loss of fidelity in the area of interest 24. As such, highlighting an area of interest 24 may include outlining the area of interest 24, shading the area of interest 24 such that the area of interest 24 appears a different color than a remainder of the composite image 20, etc. For example, each area of interest 24 may be shaded such that it has the same colors as the composite image 20 but the colors appear lighter than the composite image 20. In other embodiments, each area of interest 24 may be shaded a different color than a predominant color of the composite image 20 to highlight each area of interest 24, e.g., each area of interest 24 may have a yellow, orange, red, green, blue, etc. tint.

In at least some embodiments, the image display system 10 automatically highlights the one or more areas of interest 24. For instance, the image display system 10 highlights the area(s) of interest 24, through outlining, shading, etc., when displaying the composite image 20, with no further input from a user of the image display system 10. As described in greater detail below, the image display system 10 may utilize a highlight module 48 of its computing device 38 (FIG. 4), e.g., to execute instructions to highlight the one or more areas of interest 24 on the composite image 20 after or as part of identifying the area(s) of interest 24. In other embodiments, the image display system 10 highlights the one or more areas of interest 24 only upon input from a user to do so or upon receipt of another signal, input, etc.

In other embodiments, the area(s) of interest 24 are not highlighted on the composite image 20 displayed on the user interface 12. For example, as described above, the user may identify the areas of poor image correspondence or areas of interest 24. That is, rather than the image display system 10 automatically identifying and highlighting one or more areas of interest 24 when the image display system 10 identifies areas of poor correspondence, the image display system 10 displays the composite image 20 and the user reviews the composite image 20 and determines whether the composite image 20 includes any areas of interest 24. The user may indicate or identify an area of interest 24, for which the source images 22 are displayed as described herein, by directing the user's attention to the area of interest 24. The image display system 10 may detect where the user's attention is directed using one or more of the apparatus and/or techniques described herein. In some embodiments, the one or more areas of interest 24 identified by the user may not be highlighted like the areas of interest 24 that are outlined, shaded, etc. as described above. However, in other embodiments, the one or more areas of interest 24 identified by the user may be highlighted on the composite image 20 as described herein.

The image display system 10 allows a user to review the differences between the composite image 20 and the source images 22, e.g., to determine whether a defect or other notable detail exists in the area obscured or omitted in the composite image. In the image display system 10 shown in FIG. 1A, each source image 22 displayed in the second section 16 of the user interface 12 contains at least one pixel in at least one area of interest 24 of the composite image 20 displayed in the first section 14. While a single separate source image has been shown for each of the first area of interest 24a, the second area of interest 24b, the third area of interest 24c, and the fourth area of interest 24d, it will be understood that this need not be the case. Multiple source images 22 can be provided for a single area of interest 24 and/or a single source image 22 can be provided for multiple areas of interest 24. For example, a single source image 22 may contain at least one pixel in a first area of interest 24a and at least one pixel in a second area of interest 24b. As another example, each of a first source image 22a, a second source image 22b, and a third source image 22c may contain at least one pixel within a single area of interest 24.

Regardless of the number of source images included it will be understood that the source image(s) 22 displayed in the second section 16 are raw, unaltered source image(s) 22, i.e., not distorted, aligned for stitching, etc. as occurs when the source images 22 are combined to produce the composite image 20. Thus, the image display system 10 facilitates identification of—and in at least some instances, provides a visual cue to the presence of—differences in appearance between the composite image 20 and one or more source images 22, and by displaying the source images 22 along with the composite image 20, the image display system 10 facilitates convenient review of the differences of appearance.

Figure 1B:
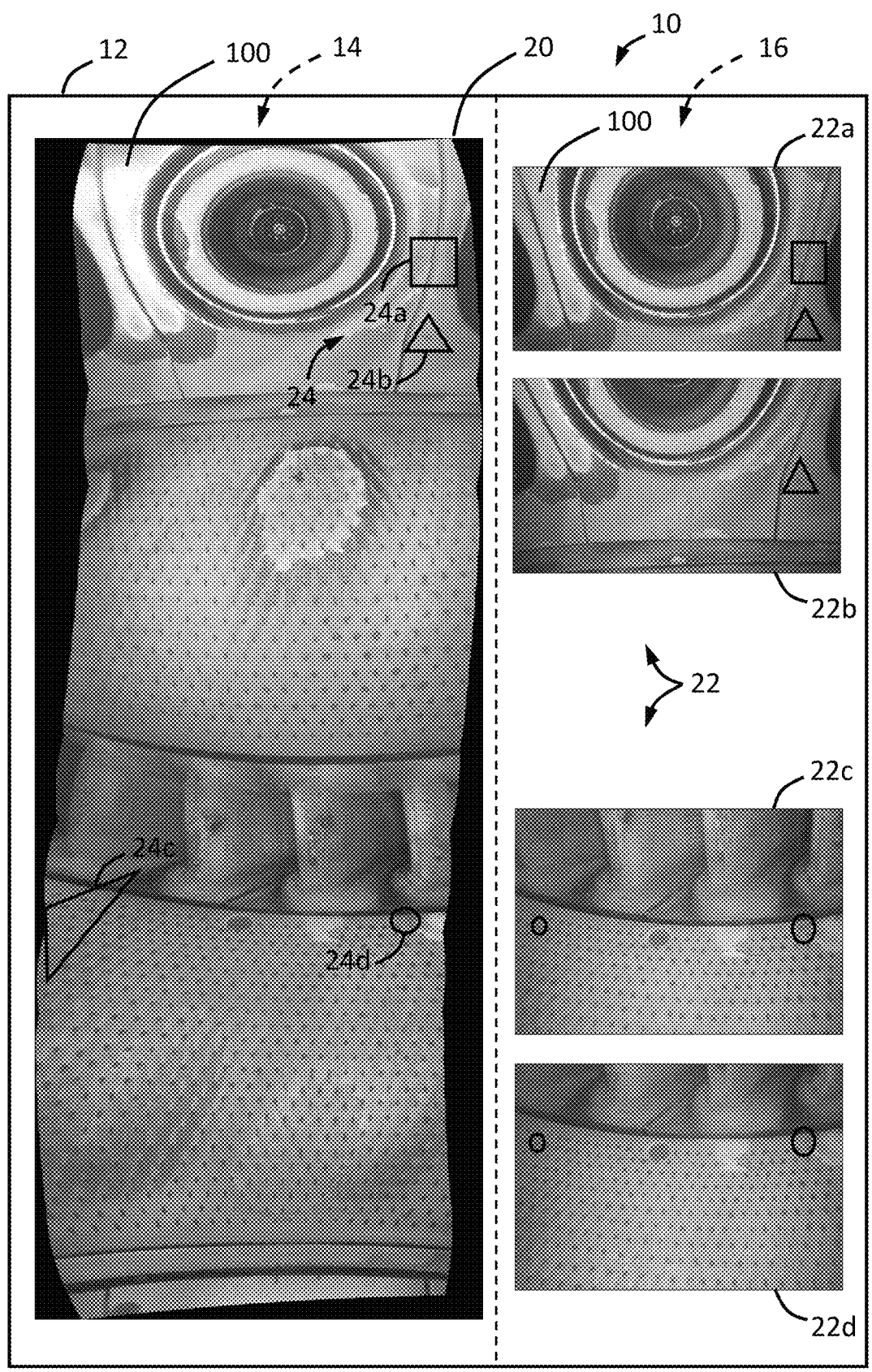
FIG. 1B provides the schematic view of FIG. 1A, with differences between the composite image and the plurality of source images indicated on both the composite image and the plurality of source images.

As one example, referring to the upper righthand portion of the composite image 20 shown in FIGS. 1A and 1B, a first area of interest 24a is highlighted with a square-shaped outline. Comparing the first area of interest 24a to a first source image 22a (the uppermost source image 22 in the second section 16 of the user interface 12 in the embodiment of FIGS. 1A and 1B), it will be appreciated that the composite image 20 includes a step in the depiction of the feature shown in the first area of interest 24a and the step is not present in the first source image 22a. To facilitate explanation, in FIG. 1B, a square-shaped outline is included on the first source image 22a in the same region as the first area of interest 24a highlighted on the composite image 20. Referring particularly to FIG. 1B, comparing the square-shaped areas in the composite image 20 and the first source image 22a, there is no step in the depicted feature in the first source image 22a but there is a step in the depicted feature in the composite image 20. It will be appreciated that the areas of poor correspondence are highlighted on the various source images 22 in FIG. 1B only for purposes of explanation and ease of understanding and need not be highlighted in implementations of the image display system 10.

As another example, a second area of interest 24b, just below the first area of interest 24a, is highlighted with a triangle-shaped or triangular outline in the embodiment of FIGS. 1A and 1B. Comparing the second area of interest 24b with the first source image 22a and a second source image 22b (shown below the first source image 22a in the second section 16 in the depicted embodiment), a generally circular "smudge" or dark area is shown in the composite image 20 and the second source image 22b but is not shown in the first source image 22a. To facilitate explanation, in FIG. 1B, a triangular outline is included on each of the first source image 22a and the second source image 22b in the same region as the second area of interest 24b highlighted on the composite image 20. Referring particularly to FIG. 1B, comparing the triangular areas in the upper portion of the composite image 20, the first source image 22a, and the second source image 22b, there is no smudge or dark area in the first source image 22a, but there is a smudge or dark area in both the composite image 20 and the second source image 22b.

As a further example, a third area of interest 24c is highlighted on the left-hand side of the composite image 20, below a horizontal midline of the composite image 20. The third area of interest 24c is highlighted by the image display system 10 in FIGS. 1A and 1B with a triangle-shaped or triangular outline. Comparing the third area of interest 24c with a third source image 22c and a fourth source image 22d in a lower half of the second section 16, an aperture that appears in both the third source image 22c and the fourth source image 22d does not appear in the composite image 20. To facilitate explanation, in FIG. 1B, a small circular outline is included on each of the third source image 22c and the fourth source image 22d in the same, left-hand region as the third area of interest 24c highlighted on the composite image 20. Referring particularly to FIG. 1B, comparing the third area of interest 24c highlighted on the composite image 20 with the small circular areas outlined on the left-hand side of each of the third source image 22c and the fourth source image 22d, there is no aperture in the composite image 20 but there is an aperture in both the third source image 22c and the fourth source image 22d.

As a still further example, a fourth area of interest 24d is highlighted on the right-hand side of the composite image 20, below the horizontal midline of the composite image 20. The fourth area of interest 24d is highlighted with a circular or circle-shaped outline. Comparing the fourth area of interest 24d with the third source image 22c and the fourth source image 22d, a generally circular "smudge" is shown in the third source image 22c that does not appear in either the composite image 20 or the fourth source image 22d. To facilitate explanation, in FIG. 1B, a circular outline is included on each of the third source image 22c and the fourth source image 22d in the same region as the fourth area of interest 24d highlighted on the composite image 20. Referring particularly to FIG. 1B, comparing the fourth area of interest 24d highlighted on the composite image 20 with the circular areas outlined on the right-hand side of each of the third source image 22c and the fourth source image 22d, there is a smudge or dark area in the third source image 22c that does not appear in either of the composite image 20 or the fourth source image 22d.

Although the composite image 20 is shown in its entirety on the user interface 12 in FIGS. 1A and 1B, in some embodiments, an entire composite image 20 may not be displayed within the first section 14. Rather, a portion of the composite image 20 may be displayed in the first section 14 of the user interface 12, and the user may scroll or otherwise manipulate the displayed composite image 20 to view portions of the composite image 20 that otherwise are not visible on the user interface 12. Similarly, all of the source images 22 may not be shown on the user interface 12. It is contemplated that source images 22 corresponding to a shown portion of the composite image 20 may be simultaneously shown to facilitate review, while other source images 22 are not visible on the user interface 12. Still further, all source images 22 corresponding to portion of the composite image 20 may not simultaneously appear on the user interface 12, but a user may scroll through or otherwise manipulate the source images 22 shown on the user interface 12 to look through some or all of the source images 22, with all of the source images 22 being available for viewing although the user may choose not to view all of the source images 22.

As described herein, a user of the image display system 10 may use the composite image 20 to inspect the article 100, where a review of such a composite image may be faster, cheaper, etc. than inspecting the article 100 itself (e.g., the user can conduct the inspection from a remote location, can inspect the internal features of the article 100 without disassembling the article 100, etc.). By highlighting differences or areas of poor image correspondence between the composite image 20 and the source images 22 or otherwise allowing a user to identify differences between the composite image 20 and the source images 22, the image display system 10 facilitates user review of the above-noted differences between each of the areas of interest 24a, 24b, 24c, 24d and the source images 22a, 22b, 22c, 22d to determine, e.g., whether a defect or other notable anomaly is shown in the source images 22 that is omitted from the composite image 20. The highlighting of areas of interest 24 and display of the source images 22 can speed up the user's review while also assisting the user in performing a thorough inspection of the article 100.

In some embodiments, only source images 22 having at least one pixel in a selected area of interest 24 used to create the composite image 20 are displayed in the second section 16 of the user interface 12. In other embodiments, all raw images of the article 100 having at least one pixel in the selected area of interest 24, regardless of whether a respective raw image is a source image 22 used to create the composite image 20, are displayed in the second section 16. The raw images, including the source images 22, may be stored as data 50 (FIG. 4) in a data library 52 and/or data warehouse 60 of the image display system 10.

It will be appreciated that the second section 16 is not confined to the position in the user interface 12 illustrated in FIGS. 1A and 1B. For example, the second section 16, in which the source images 22 are displayed, may be located within any portion of the user interface 12 and may be selectively present within the user interface 12. For instance, in some embodiments, the sources images 22 may be displayed only upon selection of an area of interest 24 by a user, such that the second section 16 is present only upon selection of the area of interest 24. Further, the sources images 22 may be displayed in front of, alongside, surrounding, or below the composite image 20, such that the second section 16 is selectively or continuously located in front of, alongside, surrounding, or below the composite image 20.

Figure 4:
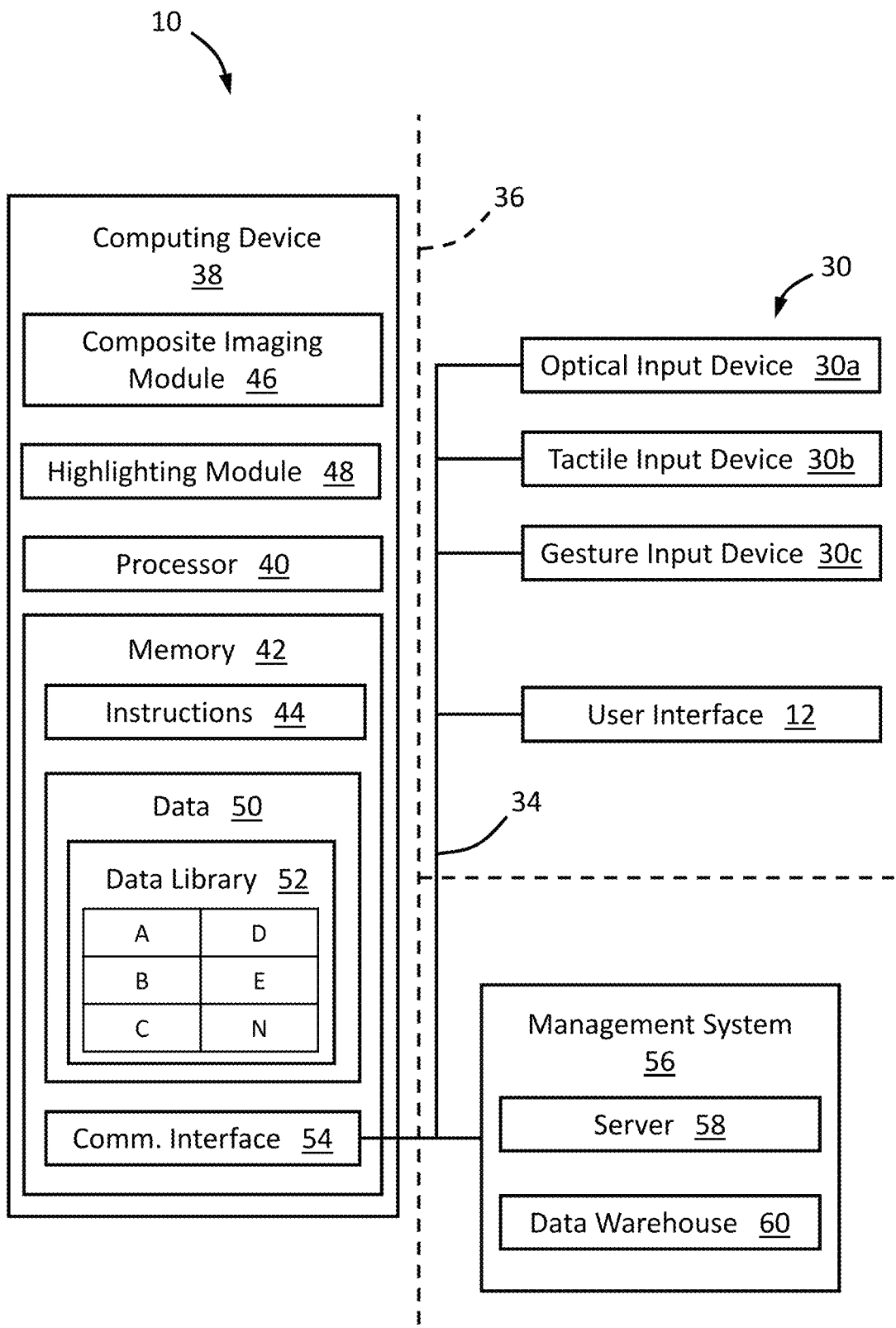
FIG. 4 provides a schematic view of an image display system.

As described, the source images 22 for an area of interest 24, or for any portion of the composite image 20, may be displayed when the user's attention is directed to that area of interest 24 or particular portion of the composite image 20. For example, the image display system 10 displays the plurality of source images 22 containing one or more pixels in an area of interest 24 or a portion of the composite image 20 in response to an input from a user input device 30 (FIG. 4), connected to a computing device 38 (FIG. 4) and/or the user interface 12. Referring to FIG. 4, as one example, the user input device 30 may be an optical input device 30a controlled by the user, e.g., by tracking the user's eyes. The image display system 10 may use a commercially available optical input device 30a, e.g., an assisted reality device, optical gaze tracking device, head movement tracking device, augmented reality device, etc., that communicatively couples to the image display system 10. In at least some embodiments, the image display system 10 receives an input from the optical input device 30a that the user's eyes are directed to an area of interest 24, or another particular portion of the composite image 20, and then displays the plurality of source images 22 used to create the composite image 20 at the area of interest 24 or another particular portion of the composite image 20.

As another example, the user input device 30 is a tactile input device 30b, i.e., the image display system 10 displays the plurality of source images 22 containing pixels in an area of interest 24 or a portion of the composite image 20 in response to an input from the tactile input device 30b controlled by the user. For instance, the tactile input device 30b may be a touch screen display, a computer mouse, a keyboard, joystick, buttons, knobs, switches, and/or combinations thereof. Similar to the optical input device 30a, the image display system 10 receives an input from the tactile input device 30b-such as a finger tap on the user interface 12 (where the user interface 12 is a touch sensitive user interface), a click of a computer mouse, depression of a button, etc.—indicating the user's attention is directed to an area of interest 24, or another particular portion of the composite image 20. Then, the image display system 10 displays the plurality of source images 22 used to create the composite image 20 at the area of interest 24 or another particular portion of the composite image 20 indicated by the user through the tactile input device 30b.

As yet another example, the user input device 30 is a gesture input device 30c, i.e., the image display system 10 displays the plurality of source images 22 containing pixels in an area of interest 24 or a portion of the composite image 20 in response to an input from the gesture input device 30c controlled by the user. For instance, the gesture input device 30c utilizes gesture recognition through a camera or imaging system, a motion recognition system using accelerometers, gyros, etc. disposed in or on a glove worn by the user, or the like. Similar to the optical and tactile input devices 30a, 30b, the image display system 10 receives an input from the gesture input device 30c-such as a finger or hand motion by the user-indicating the user's attention is directed to an area of interest 24, or another particular portion of the composite image 20. Then, the image display system 10 displays the plurality of source images 22 used to create the composite image 20 at the area of interest 24 or another particular portion of the composite image 20 indicated by the user through the gesture input device 30c.

In some embodiments, the image display system 10 may utilize one or more user input devices 30. For instance, the image display system 10 may utilize two of the user input devices 30 described herein, such as both the optical input device 30*a* and the tactile input device 30*b*, or all of the optical input device 30*a*, the tactile input device 30*b*, and the gesture input device 30*c*. Further, the image display system 10 may utilize one or more other types of user input devices 30, such as a verbal input device, etc., alone or in combination with one or more of the optical input device 30*a*, tactile input device 30*b*, and gesture input device 30*c* described herein.

The image display system 10 also may use inputs from the user input device 30 to move from source image 22 to source image 22, i.e., to scroll through the source images 22 in the second section 16 of the user interface 12. Further, the image display system 10 may use an input from the user input device 30 to transition from displaying a plurality of first source images 22*a* to displaying a plurality of second source images 22*b*, e.g., as the user's attention moves from a first area of interest 24*a* to a second area of interest 24*b*. Moreover, in some embodiments, the image display system 10 may be configured to simultaneously display both the plurality of first source images 22*a* and the plurality of second source images 22*b*, e.g., based on an input from the user, when a source image 22 is one of both the plurality of first source images 22*a* and the plurality of second source images 22*b*.

Figure 2:
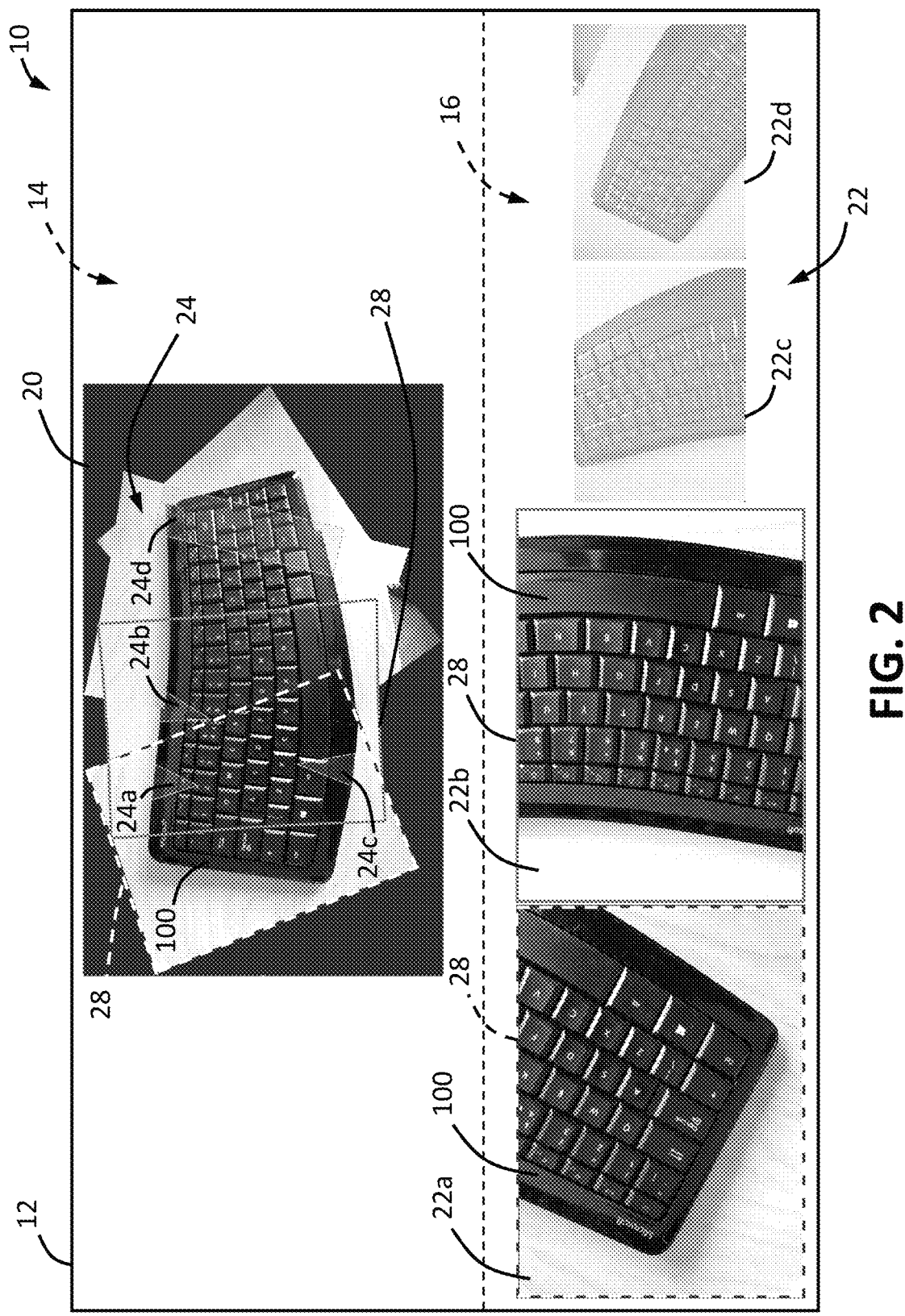
FIG. 2 provides another schematic view of a user interface of an image display system displaying both a composite image and a plurality of source images.

Referring to FIG. 2, another example is provided of a user interface 12 displaying a composite image 20 of an article 100 along with a plurality of source images 22 used to create the composite image 20. In the embodiment of FIG. 2, in addition to highlighting the areas of interest 24 by shading each area of interest 24, the source images 22 contributing to the composite image 20 (which have been distorted and aligned for stitching to create the composite image 20) are outlined on the composite image 20 to show the coverage of the respective source image 22. One or more boundaries 28 of the distorted, transformed, etc. source images 22 may be automatically indicated or outlined on the composite image 20 or may be indicated or outlined only upon an input or other signal, e.g., from the user. For instance, when the user selects an area of interest 24, e.g., using the user input device 30, the source images 22 corresponding to that area of the composite image 20 are indicated or outlined on the composite image 20. The source images 22 displayed in the second section 16 have a border or boundary that correspond to or match the border or boundary 28 of the respective source image 22 outlined on the composite image 20, e.g., to make it easier for the user to recognize the corresponding source images 22. Thus, a different color, line type, etc. may be used to indicate the borders or boundaries 28 to help distinguish one source image 22 from another.

As further illustrated in FIG. 2, the image display system 10 may display simultaneously a plurality of first source images 22*a* corresponding to a first area of interest 24*a* and a plurality of second source images 22*b* corresponding to a second area of interest 24*b*. When the user selects or directs the user's attention to a certain area of interest 24, e.g., via the user input device 30, the plurality of source images 22 corresponding to the selected area of interest 24 may be enlarged compared to the remaining source images 22 displayed in the second section 16 of the user interface 12. For instance, when the user selects or directs the user's attention to the first area of interest 24*a*, the plurality of first source images 22*a* may be enlarged relative to the plurality of second source images 22*b* within the second section 16.

As shown in FIG. 2, the source images 22 are displayed in the second section 16 of the user interface 12 in their original, unaltered state. As such, the source images 22 may not be oriented to correspond to the orientation of the composite image 20. For example, the first source image 22*a* is rotated approximately 90° in the composite image 20 with respect to its original, unaltered state as shown in the second section 16 of the user interface 12. For some images, it may be more useful to the user to display the source images 22 in the same orientation as the source images 22 are used in the composite image 20, e.g., to provide the user a visual cue as to the relationship and/or spatial orientation of the respective source image 22 with respect to the composite image 20. Thus, in some embodiments, the source images 22 may be displayed on the user interface 12 in an orientation corresponding to their orientation in the composite image 20.

Figure 3A:
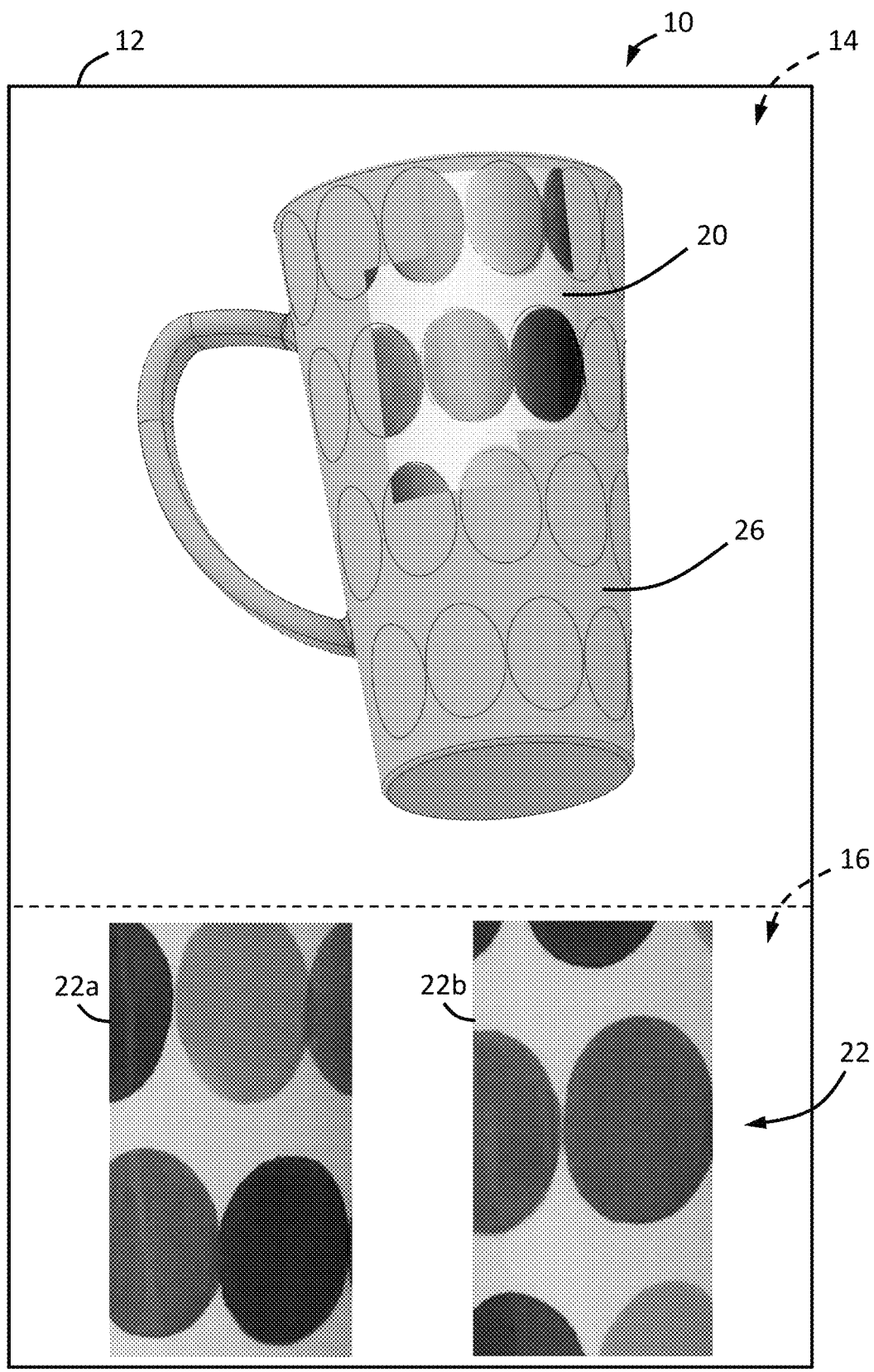
FIG. 3A provides still another schematic view of a user interface of an image display system displaying both a composite image and a plurality of source images, where the composite image is projected onto a representation of a three-dimensional (3D) surface displayed on the user interface.
Figure 3B:
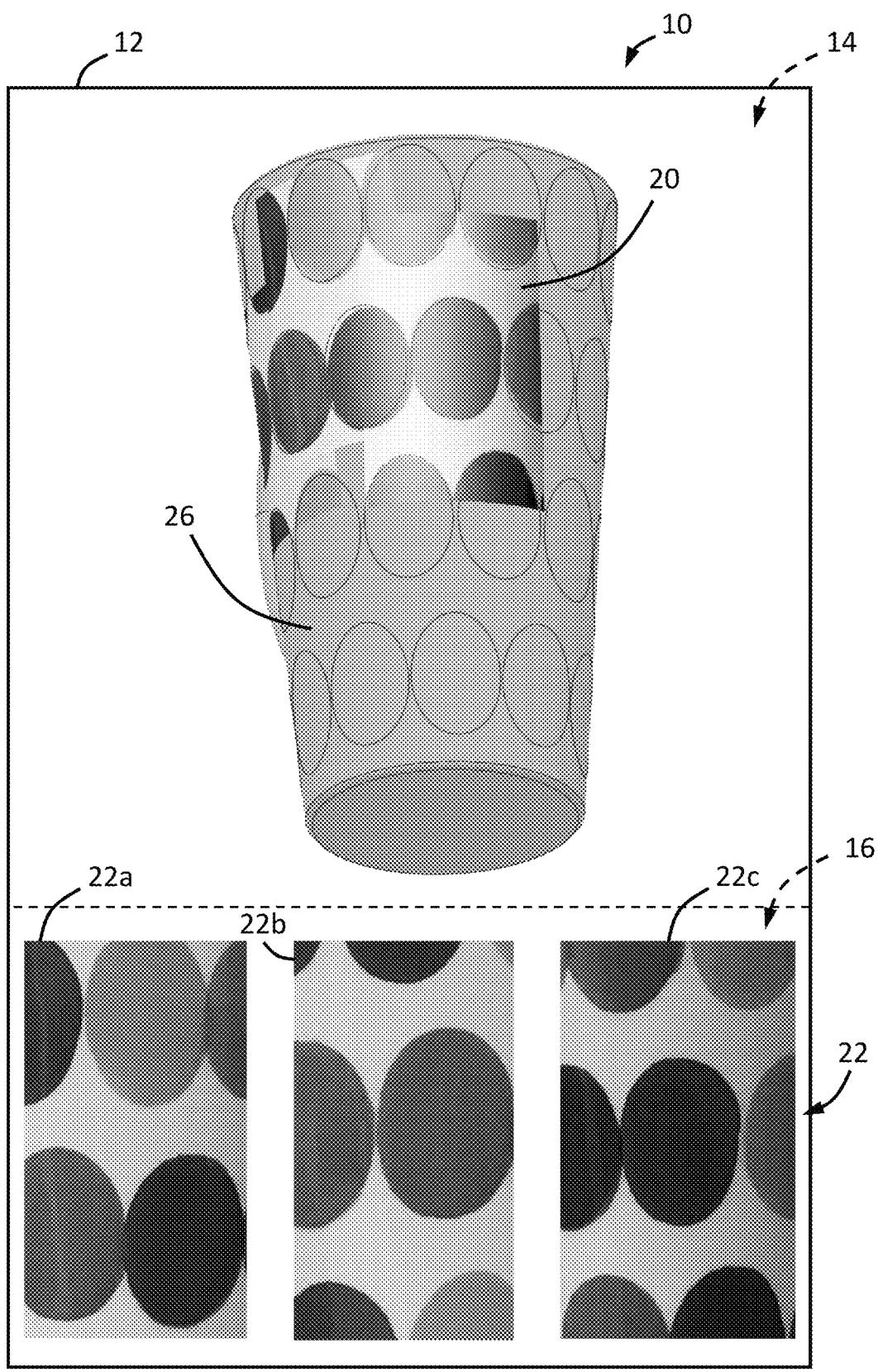
FIG. 3B provides a schematic view of the user interface of FIG. 3A, displaying the composite image in a different view or perspective from that shown in FIG. 3A.

Turning now to FIGS. 3A and 3B, in some embodiments, the composite image 20 is projected onto a representation of a three-dimensional (3D) surface 26 displayed on the user interface 12. For example, the article 100 depicted by the composite image 20 may be a 3D article, and a 3D surface 26 may be generated by the image display system 10, with the composite image 20 mapped onto the 3D surface 26 to provide a 3D composite image that is a 3D representation of the article 100 on the user interface 12. Thus, the composite image 20 may appear "painted" onto the 3D surface 26. The 3D surface 26 may be a 3D primitive such as an annulus, sphere, etc. onto which the composite image 20 of a similarly shaped article 100 may be mapped or projected to represent the article 100 more realistically on the user interface 12.

The source images 22 and area(s) of interest 24 may be displayed on the user interface 12 with the 3D composite image in the same manner as described with respect to FIGS. 1A, 1B, and 2. Further, an orientation of the 3D surface 26 or the 3D composite image may be changed in response to a user input. For instance, using the user input device 30, the orientation of the 3D surface 26 may be manipulated to change the view or perspective of the composite image 20. As such, the user can move the 3D surface on the user interface 12 to display a desired vantage point of the composite image 20. Referring to the drawings, FIG. 3A illustrates the 3D surface 26 in a first orientation, displaying the composite image 20 in one view with the source images 22 corresponding to the displayed view of the composite image 20. FIG. 3B illustrates the 3D surface 26 in a second orientation, displaying the composite image 20 in a different view from that of FIG. 3A and further displaying on the user interface 12, along with the composite image 20, the source images 22 corresponding to the displayed view of the composite image 20. It will be appreciated that, as described herein, the source images 22 displayed on the user interface 12 with the composite image 20 may correspond to an area of interest 24 within the view of the composite image 20 displayed on the user interface 12.

Referring to FIG. 4, as described herein, the image display system 10 may include a user interface 12, which may be configured to allow a user to operate the image display system 10, e.g., in conjunction with the one or more user devices 30 described herein. Various elements of the image display system 10 may be communicatively coupled with one another via wired or wireless communication lines 34 as part of a communication network 36.

Further, the image display system 10 may include one or more computing devices 38, which may be located locally or remotely relative to the user interface 12. For example, the one or more computing devices 38 may be located at a physical facility and/or a cloud-based facility. The one or more computing devices 38 may include one or more processors 40 and one or more memory devices 42. The one or more processors 40 may include any suitable processing device, such as a microprocessor, microcontroller, integrated circuit, logic device, and/or other suitable processing device. The one or more memory devices 42 may include one or more computer-readable media, including but not limited to non-transitory computer-readable media, RAM, ROM, hard drives, flash drives, and/or other memory devices.

The one or more memory devices 42 may store information accessible by the one or more processors 40, including computer-executable instructions 44 that can be executed by the one or more processors 40. The instructions 44 may include any set of instructions that when executed by the one or more processors 40 cause the one or more processors 40 to perform operations. In some embodiments, the instructions 44 may be configured to cause the one or more processors 40 to perform operations for which the image display system 10 and/or the one or more computing devices 38 are configured, such as one or more of the methods described below with reference to FIGS. 5 through 7. Exemplary operations of the image display system 10 and/or the one or more computing devices 38 may include displaying the composite image 20, highlighting one or more areas of interest 24, and displaying a plurality of source images 22.

The image display system 10 may include one or more composite imaging modules 46 and one or more highlighting modules 48. A composite imaging module 46 may be utilized by the image display system 10 to produce a composite image 20 from two or more source images 22. Additionally, or in the alternative, a composite imaging module 46 may be utilized by the image display system 10 to map a composite image 20 onto a 3D surface 26 as described with respect to FIGS. 3A and 3B. The one or more composite imaging modules 46 may be implemented in hardware and/or software, including any non-transitory computer-program product and/or cloud-based solution. Further, a composite imaging module 46 may include proprietary algorithms for stitching together two or more source images 22 to produce a composite image 20.

A highlighting module 48 may be utilized by the image display system 10 to highlight, automatically or otherwise, one or more areas of interest 24 on a composite image 20. The one or more highlighting modules 48 may be implemented in hardware and/or software, including any non-transitory computer-program product and/or cloud-based solution. Moreover, a highlighting module 48 may include proprietary algorithms for outlining, shading, or otherwise highlighting one or more areas of interest 24 to denote one or more differences (or poor image correspondence) between the composite image 20 and one or more source images 22. Although depicted in FIG. 4 separate from the one or more processors 40, it will be appreciated that, in at least some embodiments, one or more composite imaging modules 46 and/or one or more highlight modules 48 may be part of the one or more processors 40.

The memory devices 42 may store data 50 accessible by the one or more processors 40. The data 50 can include current or real-time data, past data, or a combination thereof. The data 50 may be stored in a data library 52. As examples, the data 50 may include data associated with or generated by the image display system 10, the user interface 12, the one or more computing devices 38, the one or more composite imaging modules 46, and/or the one or more highlighting modules 48. The data 50 may also include other data sets, parameters, outputs, and information associated with an image display system 10. The data 50, including the data library 52 and/or other data sets, parameters, outputs, and information may be utilized by the one or more composite imaging modules 46 and/or the one or more highlighting modules 48 to perform operations for which they are configured.

The one or more computing devices 38 may also include a communication interface 54, which may be used for communications with the communication network 36. The communication interface 54 may include any suitable components for interfacing with one or more network(s), including, for example, transmitters, receivers, ports, controllers, antennas, and/or other suitable components. The communication interface 54 may allow the one or more computing devices 38 to communicate with, e.g., the user interface 12. The communication network 36 may include, for example, a local area network (LAN), a wide area network (WAN), SATCOM network, VHF network, a HF network, a Wi-Fi network, a WiMAX network, a gatelink network, and/or any other suitable communication network 36 for transmitting and/or receiving data messages. The communication lines 34 of the communication network 36 may include a data bus or a combination of wired and/or wireless communication links.

In some embodiments, the image display system 10 includes a management system 56 configured to provide enterprise-level control for one or more elements of the image display system 10. The management system 56 may include a server 58 and/or a data warehouse 60. As an example, at least a portion of the data 50 may be stored in the data warehouse 60, and the server 58 may be configured to transmit data 50 from the data warehouse 60 to the one or more computing devices 38, and/or to receive data 50 from the one or more computing devices 38 and to store the received data 50 in the data warehouse 60 for further purposes. The server 58 and/or the data warehouse 60 may be implemented as part of an image display system 10.

Figure 5:
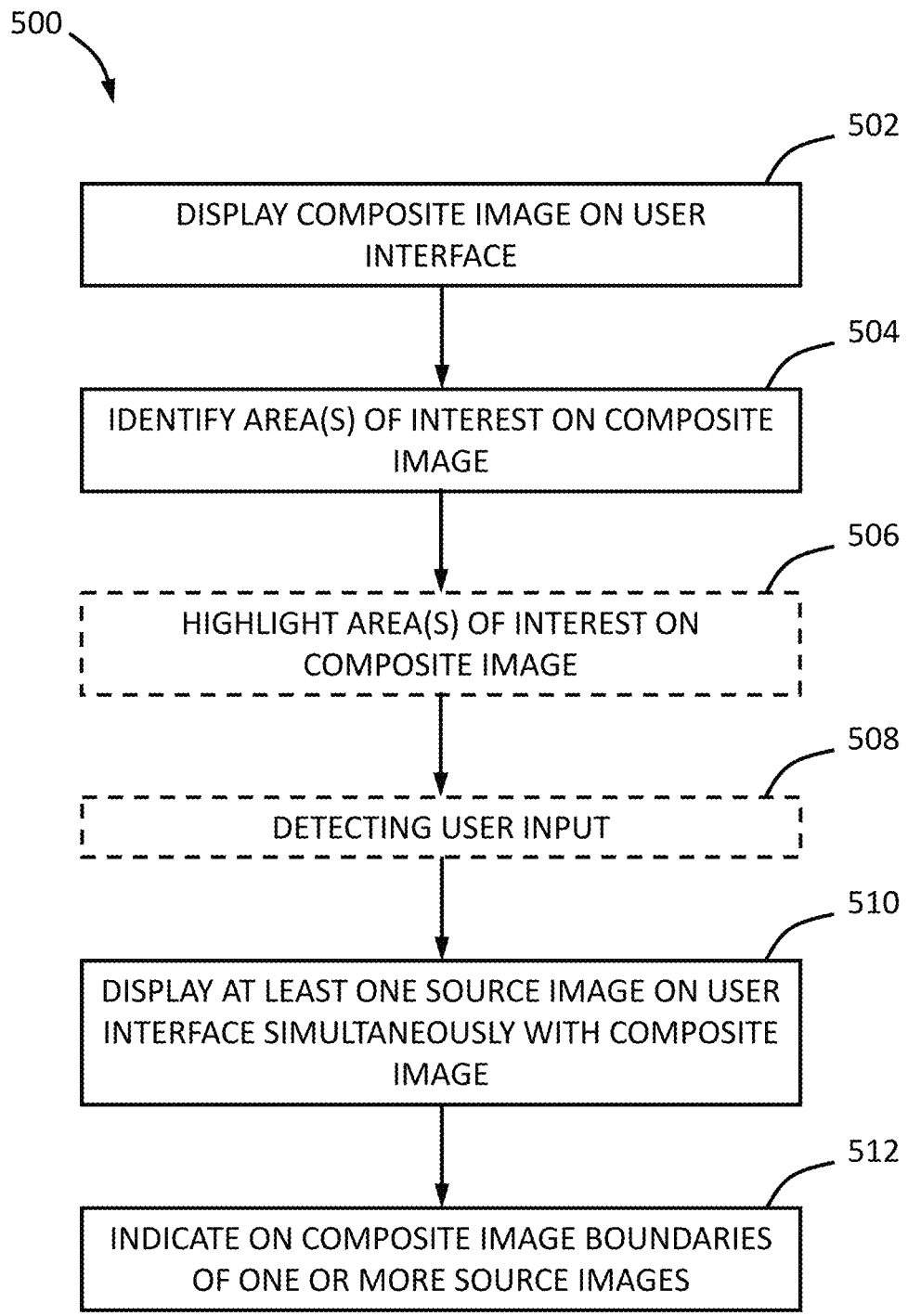
FIG. 5 provides a flow diagram illustrating a method for presenting raw image data or source images with a composite image on a user interface in accordance with an exemplary aspect of the present disclosure.

Referring now to FIG. 5, a method of presenting raw or source images with a composite image also are provided. As shown in the flow diagram of FIG. 5, a method 500 includes (502) displaying a composite image 20 on a user interface 12, such as the user interface 12 of the image display system 10 described with respect to FIGS. 1A-4. As described herein, the composite image 20 may be displayed within a first section 14 of the user interface 12.

As further illustrated in FIG. 5, the method 500 includes (504) identifying one or more areas of interest 24 on the composite image 20. As described herein, an area of interest 24 is an area or portion of the composite image 20 that is different from or has poor correspondence with one or more source images 22 used to create the composite image 20. For example, one or more features shown in the one or more source images 22 may be partially or fully omitted in the composite image 20. As another example, one or more features shown in the one or more source images 22 may be incorrectly rendered in the composite image 20. When using a composite image 20 to inspect an article 100, for instance, the differences or areas of poor correspondence in the composite image 20 can mask defects in the component or erroneously suggest one or more defects are present, such that the area(s) of interest 24 (where there are differences or poor correspondence between the source image(s) 22 and the composite image 20) are identified to facilitate review of such area(s) interest 24 to determine whether a defect or other abnormality exists. As described herein, the one or more areas of interest 24 may be identified through a user input (e.g., through eye tracking, selection or tactile manipulation, and/or a gesture) upon the user's manual review of the composite image 20, or the one or more areas of interest 24 may be identified through an image analysis by the image display system 10, which may be automatically initiated by the image display system 10 or may be initiated upon an input by the user.

In at least some embodiments, upon identifying the one or more areas of interest 24, the method 500 includes (506) automatically highlighting the area of interest 24. That is, as the composite image 20 is displayed on the user interface 12, the area of interest 24 is automatically highlighted by the one or more computing devices 38, e.g., using the one or more highlighting modules 48 as described herein. In other embodiments, the area of interest 24 is highlighted only upon receipt of a signal or input to do so, e.g., after a manual review of the composite image 20, the image display system 10 receives an input from a user to highlight areas of interest 24 on the composite image 20. Further, in some embodiments, highlighting an area of interest 24 comprises highlighting a first area of interest 24a on the composite image 20 and a second area of interest 24b on the composite image 20. Of course, any number of areas of interest 24, corresponding to differences or poor image correspondence between the composite image 20 and one or more source images 22, may be highlighted on the composite image 20. For example, highlighting the area of interest 24 may comprise highlighting a first area of interest 24a, a second area of interest 24b, etc. up to the number of areas of interest 24 in which the image display system 10 detects differences between the composite image 20 and the underlying source images 22.

As previously described, highlighting the area of interest 24, whether automatically or otherwise, can be achieved in several different ways. For instance, in some embodiments, highlighting the area of interest 24 comprises outlining the area of interest 24, e.g., with a border that may vary in shape, size, color, line type, etc. from one area of interest 24 to another for a composite image 20 having a plurality of areas of interest 24. As an example, the image display system 10 may automatically highlight the area of interest 24 by automatically outlining the area of interest 24 when the composite image 20 is displayed on the user interface 12. In other embodiments, highlighting the area of interest 24 comprises shading the area of interest 24, e.g., in a different color, tone, saturation, pattern, etc., which may vary from one area of interest 24 to another for a composite image 20 having a plurality of areas of interest 24. For example, the image display system 10 may automatically highlight the area of interest 24 by automatically shading the area of interest 24 when the composite image 20 is displayed on the user interface 12.

In other embodiments, (506) highlighting the area(s) of interest 24 is omitted and the area(s) of interest 24 are not highlighted on the composite image 20, such that (506) in method 500 may be optional. Instead of highlighting the area(s) of interest 24, in identifying the area of interest 24, the image display system 10 recognizes that the user is directing his or her attention to an area of the composite image 20. For example, the image display system 10 may identify one pixel of the composite image 20 as the focus of the user's attention and may recognize the area of interest 24 as the area within a certain number of pixels of the one identified pixel. For instance, the area of interest 24 may be the area within 50, 100, etc. pixels of the one identified pixel, e.g., the one identified pixel may be the center pixel of a 50×50 pixel area, 100×100 pixel area, etc. In some embodiments, at (504) of method 500, the image display system 10 may recognize that the user is directing their attention to a plurality of areas of interest 24 and, thus, may identify more than one area of interest 24, such as a first area of interest 24a, a second area of interest 24b, etc., without highlighting the plurality of areas of interest 24.

For a composite image 20 comprising more than one area of interest 24, the method 500 also optionally includes (508) detecting a user input to signal to which area of interest 24 of the plurality of areas of interest 24 the user is directing their attention. As described herein, for embodiments where the image display system 10 detects an optical input, the optical input may be detected using an optical input device 30a, e.g., by tracking the user's eyes using the optical input device 30a. In embodiments where the image display system 10 detects a tactile input, the tactile input may be detected using a tactile input device 30b such as a touch screen display, a computer mouse, a keyboard, joystick, buttons, knobs, switches, and/or combinations thereof. In embodiments where the image display system 10 detects a gesture input, the gesture input may be detected using a gesture input device 30c such as a camera or imaging system, a motion recognition system using accelerometers, gyros, etc. disposed in or on a glove worn by the user, or the like.

As further shown in FIG. 5, the method 500 includes (510) displaying on the user interface 12, simultaneously with the composite image 20, at least one source image 22. In one example, each source image 22 displayed simultaneously with the composite image 20 contains at least one pixel in the area of interest 24. In some embodiments, the image display system 10 displays only the source images 22 containing pixels in an area of interest 24 of the composite image 20 to which a user directs their attention. For instance, as described herein, the image display system 10 may comprise a user input device 30 to receive, e.g., optical inputs, tactile inputs, and/or gesture inputs from the user to indicate where the user's attention is directed. When the user directs their attention to particular area of interest 24, e.g., as detected through the user input device 30 as described with respect to (508), the image display system 10 displays source images 22 in a data library 52 and/or data warehouse 60 that contain pixels in the area of interest 24. For example, the image display system 10 may detect a user input through the user input device 30 that signals the image display system 10 to display a plurality of first source images 22a, which each have at least one pixel in a first area of interest 24a of the plurality of areas of interest 24. Another user input through the user input device 30 signals the image display system 10 to display a plurality of second source images 22b, which each have at least one pixel in a second area of interest 24b of the plurality of areas of interest 24. The image display system 10 may be able to display all source images 22 that contain pixels in the respective area of interest 24 in the second section 16 of the user interface 12, or the user may have to scroll through the source images 22 because not all of the source images 22 can be displayed simultaneously in the second section 16.

In other embodiments, the image display system 10 displays a plurality of source images 22 simultaneously with the composite image 20, with not all source images 22 containing at least one pixel in an area of interest 24 to which the user directs their attention. For example, as described with respect to FIGS. 1 and 2, the image display system 10 may display both a plurality of first source images 22a and a plurality of second source images 22b, corresponding to source images having at least one pixel in a first area of interest 24a and to source images having at least one pixel in a second area of interest 24b, respectively. The image display system 10 may enlarge the corresponding plurality of source images 22 when the user's attention is directed to a particular area of interest. For instance, to display more source images 22 within the second section 16 of the user interface 12, the image display system 10 may display thumbnail source images 22, which are relatively small, and the image display system 10 enlarges a respective source image 22 when the user directs their attention to the respective source image 22. Additionally, or alternatively, the image display system 10 may decrease the saturation of or "gray out" the plurality of source images 22 that does not correspond to the area of interest 24 to which the user's attention is directed.

As described with respect to FIG. 2, in at least some embodiments, the method 500 also comprises (512) indicating on the composite image 20 one or more boundaries 28 of one or more source images 22 of the plurality of source images 22 used to create the composite image 20. The boundaries 28 of the one or more source images 22 may be outlined on the composite image, e.g., using a variety of line types or styles (e.g., dashed, solid, dash-dot-dash, etc.), line colors, or the like. Further, the source images 22 displayed in the second section 16 of the user interface 12 may be correspondingly outlined in the same line type/style, line color, etc. to make it easier for the user to visually connect the distorted, transformed, rotated, etc. source image 22 in the composite image 20 with the unaltered source image 22 displayed in the second section 16. As described herein, the boundaries 28 may be automatically indicated upon display of the composite image 20 or may be indicated only upon a signal or input, e.g., an input from the user.

As described with respect to (508), the method 500 may include detecting a user input, such as an optical input, tactile input, gesture input, etc. In some embodiments, the user input may signal to the image display system 10 to display the boundaries 28 of one or more source images 22 of the plurality of source images 22. That is, the user input may indicate the area of interest 24 to which the user's attention is directed, and the user input can signal to the image display system 10 to indicate the boundaries 28 of the source images 22 contributing to that area of interest 24. As described herein, the user input may be detected through the user input device 30, e.g., an optical input device 30a, a tactile input device 30b, a gesture input device 30c, etc.

Figure 6:
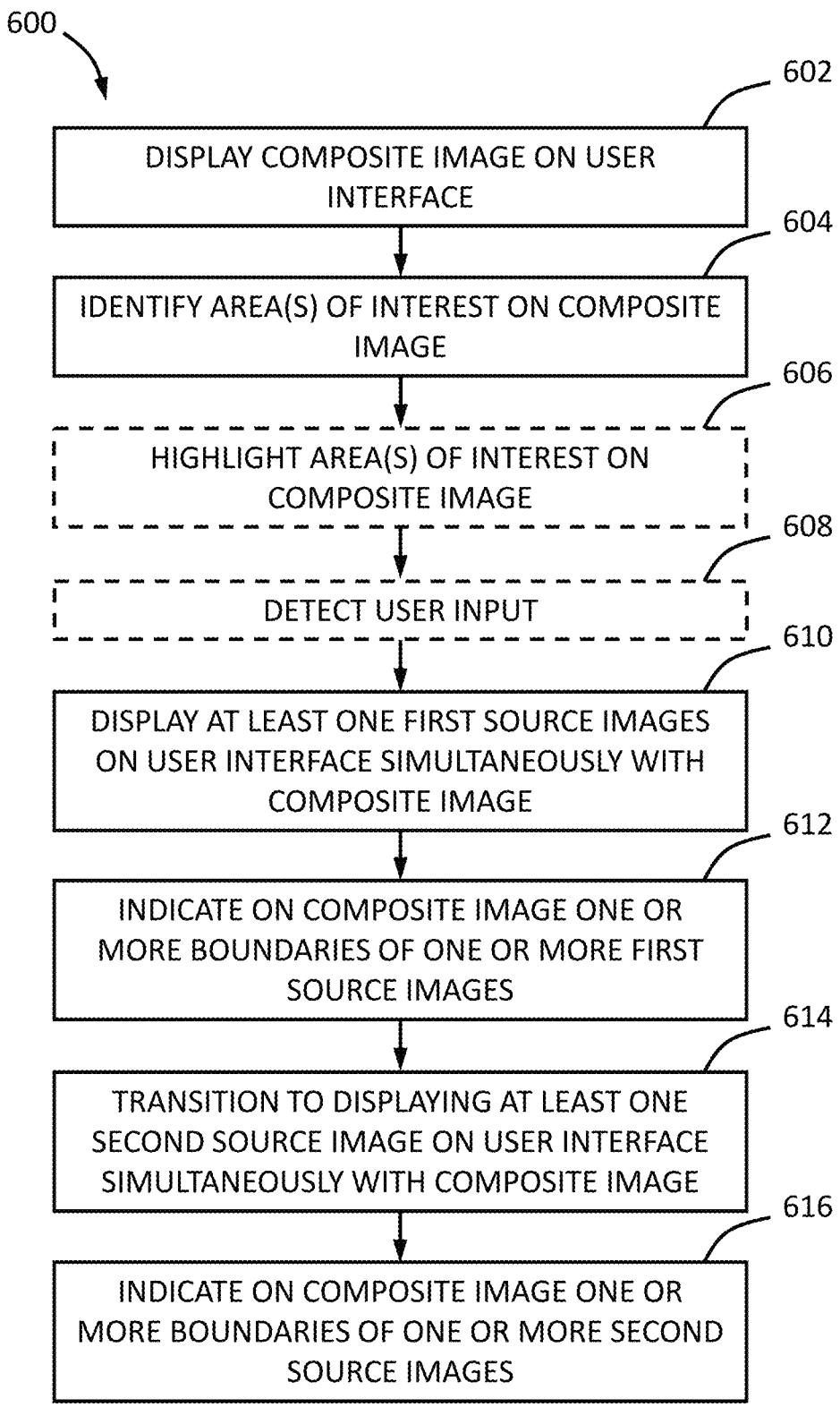
FIG. 6 provides a flow diagram illustrating a method for presenting raw image data or source images with a composite image on a user interface in accordance with another exemplary aspect of the present disclosure.

Turning to FIG. 6, another method of presenting raw image data or source images with a composite image is illustrated. As shown in the flow diagram of FIG. 6, the depicted method 600 includes (602) displaying a composite image 20 on a user interface 12, (604) identifying one or more areas of interest 24 on the composite image 20, optionally (606) highlighting the one or more areas of interest 24 on the composite image 20, optionally (608) detecting an optical or tactile input signaling to which area of interest 24 of a plurality of areas of interest 24 the user is directing their attention, (608) displaying a plurality of first source images 22a on the user interface along with (or simultaneously with) the composite image 20, and (610) indicating on the composite image 20 the boundaries 28 of one or more first source images 22a. It will be appreciated that (602) through (612) correspond to (502)-(512) of method 500, with the area of interest 24 being a first area of interest 24a and the at least one source image 22 being at least one first source image 22a, such that the description of each of (502) through (512) applies to (602) through (612), respectively, and need not be repeated here.

Keeping with FIG. 6, the method 600 further comprises (614) transitioning to displaying on the user interface 12 at least one second source image 22b, each second source image 22b displayed on the user interface 12 containing at least one pixel in a second area of interest 24b. As described herein, the image display system 10 may detect through the user input device 30 that the user is moving the user's attention from the first area of interest 24a or the plurality of first sources images 22a to the second area of interest 24b. For example, as described above, the user may move the user's eyes from one area of interest 24 to another area of interest 24, the user may select an icon (such as an arrow or button) on the user interface 12, and/or the user may gesture toward a different area of interest 24 or group of source images 22, each of which may generate a signal detectable by the image display system 10 that indicates the user is moving the user's attention from one item to another. When the image display system 10 detects the shift in the user's attention, the image display system 10 transitions from displaying in the second section 16 of the user interface 12 the plurality of first source images 22a to displaying in the second section 16 the plurality of second source images 22b, which are the source images 22 that contain at least one pixel in the second area of interest 24b of the composite image 20.

Also, the method 600 includes (616) indicating on the composite image 20 one or more boundaries 28 of one or more second source images 22b. As previously described, the boundaries 28 of the source images 22 for the area of interest 24 to which the user directs the user's attention may be outlined or otherwise indicated, e.g., to allow the user to visualize how a respective source image 22 is used and altered in the composite image 20. Therefore, when the displayed source images 22 transition from the plurality of first source images 22a to the plurality of second source images 22b, the boundaries 28 indicated on the composite image 20 transition from those of one or more first source images 22a to those of one or more second source images 22b. The boundaries 28 of the second source images 22b may be indicated automatically, e.g., substantially simultaneous with transitioning to displaying the plurality of second source images 22b, or upon receipt by the image display system 10 of an input or other signal prompting display of the boundaries 28.

Figure 7:
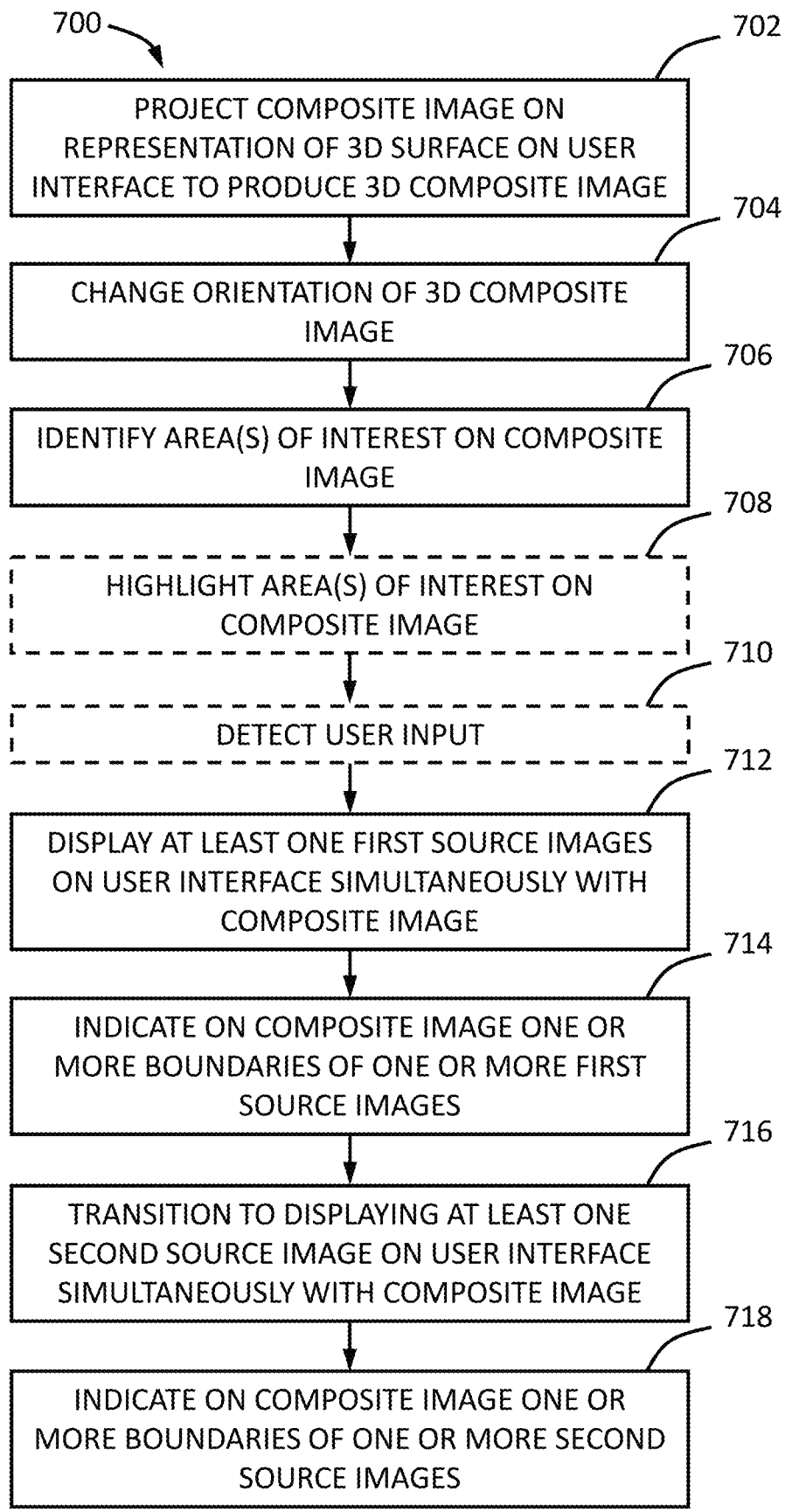
FIG. 7 provides a flow diagram illustrating a method for presenting raw image data or source images with a composite image on a user interface in accordance with yet another exemplary aspect of the present disclosure.

As described with respect to FIGS. 3A and 3B, in some embodiments, displaying the composite image 20 on the user interface 12 comprises projecting the composite image 20 onto a representation of a three-dimensional (3D) surface 26 displayed on the user interface 12. FIG. 7 depicts another method of presenting raw image data or source images with a composite image, where the composite image 20 is mapped onto a 3D surface 26. The method 700 shown in FIG. 7 includes (702) projecting or mapping the composite image 20 onto a representation of the 3D surface 26 displayed on the user interface 12. As described herein, the resulting 3D composite image is displayed in a first section 14 of the user interface 12.

The method 700 further includes (704) changing an orientation of the representation of the 3D surface 26 in response to a user input. For example, the 3D surface 26, with the composite image 20 projected or mapped thereon such that the composite image is a 3D composite image, may be rotated or otherwise manipulated to change what portion of the 3D composite image is visible to the user. The user input may be, e.g., an optical input through an optical input device 30a, a tactile input through a tactile input device 30b, and/or a gesture input through a gesture input device 30c, which are described more fully elsewhere herein. Further, it will be appreciated that the orientation of the 3D composite image may be changed at other points in the method 700, e.g., after (706) identifying the one or more areas of interest 24, after (712) displaying at least one first source image 22a on the user interface 12, and/or after (716) displaying at least one second source image 22b on the user interface 12. For instance, the user may look for additional areas of interest 24 after reviewing the source images 22 corresponding to an area of interest 24 in one portion of the 3D composite image, and the image display system 10 may change the orientation of the 3D composite image in response to an input from the user directing the user's attention to a different portion of the 3D composite image.

Like the methods 500 and 600 described above, the method 700 also includes (706) identifying one or more areas of interest 24 on the 3D composite image, optionally (708) highlighting the one or more areas of interest 24 on the 3D composite image, optionally (710) detecting an optical or tactile input signaling to which area of interest 24 of a plurality of areas of interest 24 the user is directing their attention, (712) displaying at least one first source image 22a on the user interface along with (or simultaneous with) the 3D composite image, and (714) indicating on the 3D composite image one or more boundaries 28 of one or more first source images 22a. As described with respect to method 600, in at least some embodiments, the method 700 further includes (716) transitioning from displaying at least one first source image 22a to displaying at least one second source image 22b simultaneously with the 3D composite image and (718) indicating on the 3D composite image one or more boundaries 28 of one or more second source images 22b. It will be appreciated that (706) through (718) correspond to the similar portions of methods 500 and 600 such that the description of, e.g., (504) through (512) and (604) through (616) applies to (706) through (718) and need not be repeated here.

As will be appreciated, one or more of the methods 500, 600, 700 described above may be computer implemented methods (e.g., using the image display system 10 of FIG. 4). In such a manner, one or more (or all) of the steps described above of the methods 500, 600, 700 may be performed using one or more computing devices, such as the computing device 38 of FIG. 4. In addition, in response to one or more of the steps outlined above of the methods 500, 600, 700, the user may make repair or maintenance decisions on the component or group of components depicted in the composite image. For example, the user may determine a level of damage of the component or group of components depicted in the composite image, and optionally may initiate an action in response. For example, the user may schedule a repair or maintenance operation for the component or group of components depicted in the composite image.

Accordingly, as described herein, the present subject matter provides methods and systems for displaying source images along with a composite image. Image stitching can be used to create a composite or stitched image of an object or article, such as an object or article under inspection. The composite or stitched image comprises two or more individual images taken synchronously or asynchronously, from one position with different view directions or from multiple viewpoints. A risk with composite or stitched images is that detail may be lost in the process of distortion, scaling, alignment (linear and rotary), adjustment for lighting homogeneity, and/or numerical combination. As described herein, the inventors have solved the problem of features or defects being omitted or obscured in the composite or stitched image due to the loss of detail by presenting both stitched and unstitched data conveniently. For example, one or more areas having poor image correspondence or a potential loss of fidelity between a source image and the composite image may be highlighted on the composite image to give a user a visual cue that differences exist between the source images and composite image. The source images in the one or more areas are displayed along with the composite image on a user interface. The user can then review the source images to determine if a feature or defect is present in the object or article that does not appear in the composite image, with the review of the source images allowing a more thorough review of the object or article than reviewing the composite image alone. Accordingly, the subject matter described herein facilitates the use of composite or stitched images for purposes such as, e.g., inspection of a system, assembly, or component, where a user can quickly and conveniently conduct the inspection, onsite or remotely, with a relatively high degree of confidence that such a digital visual inspection, rather than an actual visual inspection (which could require disassembling an assembly, etc.), has revealed all notable features, defects, etc. Other advantages of the subject matter described herein also may be realized by those of ordinary skill in the art.

Further aspects of the present disclosure are provided by the subject matter of the following clauses:

1. A method comprising displaying a composite image on a user interface; identifying an area of interest on the composite image; and displaying at least one source image on the user interface simultaneously with the composite image, the at least one source image containing at least one pixel in the area of interest.

2. The method of any preceding clause, further comprising highlighting the area of interest on the user interface by outlining the area of interest.

3. The method of any preceding clause, further comprising highlighting the area of interest on the user interface by shading the area of interest.

4. The method of any preceding clause, further comprising automatically highlighting the area of interest on the user interface as the composite image is displayed on the user interface.

5. The method of any preceding clause, wherein displaying on the user interface the at least one source image comprises displaying on the user interface a plurality of source images, each source image of the plurality of source images containing at least one pixel in the area of interest.

6. The method of any preceding clause, wherein the composite image comprises multiple areas of interest, and further comprising detecting an input from a user input device prior to displaying the at least one source image, wherein the input relates to a first area of interest of the multiple areas of interest, and wherein displaying the at least one source image on the user interface simultaneously with the composite image comprises displaying at least one first source image on the user interface simultaneously with the composite image, the at least one first source image having at least one pixel in the first area of interest.

7. The method of any preceding clause, wherein the user input device is at least one of an optical input device, a tactile input device, and a gesture input device.

8. The method of any preceding clause, wherein displaying the composite image on the user interface comprises projecting the composite image onto a representation of a three-dimensional surface displayed on the user interface.

9 The method of any preceding clause, further comprising highlighting a first area of interest on the composite image and highlighting a second area of interest on the composite image.

10. The method of any preceding clause, wherein displaying the at least one source image on the user interface simultaneously with the composite image comprises initially displaying at least one first source image on the user interface simultaneously with the composite image, the at least one first source image containing at least one pixel in the first area of interest, and further comprising transitioning to displaying at least one second source image on the user interface simultaneously with the composite image, the at least one second source image containing at least one pixel in the second area of interest.

11. The method of any preceding clause, wherein displaying the at least one source image on the user interface simultaneously with the composite image comprises displaying at least one first source image and at least one second source image on the user interface simultaneously with the composite image, the at least one first source image containing at least one pixel in the first area of interest and the at least one second source image containing at least one pixel in the second area of interest.

12. The method of any preceding clause, further comprising indicating on the composite image at least one boundary of the at least one source image.

13. The method of any preceding clause, wherein the composite image comprises multiple areas of interest, and further comprising detecting an input from a user input device prior to indicating on the composite image the at least one boundary of the at least one source image, wherein the input signals to display at least one boundary related to source images having at least one pixel in a first area of interest.

14. The method of any preceding clause, wherein the user input device is at least one of an optical input device, a tactile input device, and a gesture input device.

15. The method of any preceding clause, wherein the composite image is an image of a gas turbine engine component.

16. The method of any preceding clause, wherein the gas turbine engine component is at least one of a rotor blade, a stator vane, a stage of rotor blades, a stage of stator vanes, and a combustor liner.

17. The method of any preceding clause, wherein displaying the composite image comprises displaying a portion of the composite image on the user interface such that a remaining portion of the composite image is not visible on the user interface.

18. The method of any preceding clause, further comprising highlighting the area of interest upon receipt of a user input.

19. The method of any preceding clause, wherein the at least one source image is a plurality of source images, and further comprising, when a user directs the user's attention to a respective source image of the plurality of source images, enlarging the respective source image on the user interface.

20. A method comprising projecting a composite image onto a representation of a three-dimensional (3D) surface displayed on a user interface to produce a 3D composite image: changing an orientation of the 3D composite image in response to a first user input: identifying an area of interest on the composite image; and displaying at least one source image on the user interface simultaneously with the composite image, the at least one source image containing at least one pixel in the area of interest.

21. The method of any preceding clause, further comprising automatically highlighting a plurality of areas of interest as the 3D composite image is displayed on the user interface, wherein displaying at least one source image on the user interface simultaneously with the composite image comprises displaying at least one first source image on the user interface simultaneously with the composite image, the at least one first source image containing at least one pixel in a first area of interest, and further comprising indicating on the 3D composite image one or more boundaries of the at least one first source image.

22. The method of any preceding clause, wherein identifying the area of interest comprises recognizing the area of interest based on a second user input to a user input device.

23. The method of any preceding clause, wherein the first user input is detected through at least one of an optical input device, tactile input device, and a gesture input device.

24. An image display system comprising a user interface comprising a first section configured to display a composite image and a second section configured to display a plurality of source images, each source image of the plurality of source images containing at least one pixel in an area of interest identified on the composite image displayed in the first section, wherein the user interface is configured to simultaneously display the composite image and the plurality of source images.

25. The image display system of any preceding clause, further comprising a user input device.

26. The image display system of any preceding clause, wherein the user input device comprises at least one of an optical input device, tactile input device, and a gesture input device.

This written description uses examples to disclose the present subject matter, including the best mode, and also to enable any person skilled in the art to practice the disclosure, including making and using any devices or systems and performing any incorporated methods. The patentable scope of the present disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method, comprising:
    selecting an area of interest on a gas turbine engine component;
    receiving a plurality of source images, wherein one or more of the plurality of source images visually present the area of interest;
    creating a composite image by stitching the plurality of source images of the gas turbine engine component, the composite image including the area of interest which in the composite image has lost detail compared to the same area of interest as presented in the one or more of the plurality of source images;
    displaying the composite image on a user interface;
    automatically highlighting the area of interest on the composite image as the composite image is displayed on the user interface;
    displaying the one or more source images to visually present the area of interest on the user interface simultaneously with the composite image;
    comparing the one or more source images to the composite image;
    automatically highlighting, based on the comparing, the area of interest within a portion of the displayed source image as the one or more source images are displayed on the user interface, wherein a visual difference exists between the area of interest as presented in the composite image and the area of interest as presented in the one or more source images;
analyzing the area of interest to determine if damage is present on the gas turbine engine component as shown by the visual difference; and
based upon the analyzing, scheduling and initiating a maintenance operation when damage is present on the gas turbine engine component.

2. The method of claim 1, further comprising:
highlighting the area of interest on the user interface by outlining the area of interest.

3. The method of claim 1, further comprising:
highlighting the area of interest on the user interface by shading the area of interest.

4. The method of claim 1, wherein displaying on the user interface the one or more source images comprises displaying on the user interface a plurality of source images, each source image of the plurality of source images containing at least one pixel in the area of interest.

5. The method of claim 1, wherein the composite image comprises multiple areas of interest, and further comprising:
detecting an input from a user input device prior to displaying the one or more source images,
wherein the input relates to a first area of interest of the multiple areas of interest, and
wherein displaying the one or more source images on the user interface simultaneously with the composite image comprises displaying at least one first source image on the user interface simultaneously with the composite image, the at least one first source image having at least one pixel in the first area of interest.

6. The method of claim 5, wherein the user input device is at least one of an optical input device, a tactile input device, and a gesture input device.

7. The method of claim 1, wherein displaying the composite image on the user interface comprises projecting the composite image onto a representation of a three-dimensional surface displayed on the user interface.

8. The method of claim 1, further comprising:
highlighting a first area of interest on the composite image and highlighting a second area of interest on the composite image.

9. The method of claim 8, wherein displaying the one or more source images on the user interface simultaneously with the composite image comprises initially displaying at least one first source image on the user interface simultaneously with the composite image, the at least one first source image containing at least one pixel in the first area of interest, and further comprising:
transitioning to displaying at least one second source image on the user interface simultaneously with the composite image, the at least one second source image containing at least one pixel in the second area of interest.

10. The method of claim 8, wherein displaying the one or more source images on the user interface simultaneously with the composite image comprises displaying at least one first source image and at least one second source image on the user interface simultaneously with the composite image, the at least one first source image containing at least one pixel in the first area of interest and the at least one second source image containing at least one pixel in the second area of interest.

11. The method of claim 1, further comprising:
indicating on the composite image at least one boundary of the one or more source images.

12. The method of claim 11, wherein the composite image comprises multiple areas of interest, and further comprising:
detecting an input from a user input device prior to indicating on the composite image the at least one boundary of the one or more source images,
displaying at least one boundary related to source images having at least one pixel in a first area of interest in response to the input from the user input device.

13. The method of claim 12, wherein the user input device is at least one of an optical input device, a tactile input device, and a gesture input device.

14. The method of claim 1, identifying and displaying at least two areas of interest onto the one or more source images and the composite image.

15. The method of claim 14, wherein the at least two areas of interest displayed are highlighted via an outline, wherein the outline is different for each of the at least two areas of interest.

16. A method, comprising:
selecting an area of interest on a gas turbine engine component:
receiving a plurality of source images, wherein one or more of the plurality of source images visually present the area of interest;
creating a composite image by stitching the plurality of source images of the gas turbine engine component, the composite image including the area of interest which in the composite image has lost detail compared to the same area of interest as presented in the one or more of the plurality of source images;
projecting the composite image onto a representation of a three-dimensional (3D) surface displayed on a user interface to produce a 3D composite image;
changing an orientation of the 3D composite image in response to a first user input;
automatically highlighting a plurality of areas of interest as the 3D composite image is displayed on the user interface;
displaying the one or more source images to visually present the area of interest on the user interface simultaneously with the composite image, wherein displaying at least one source image on the user interface simultaneously with the composite image comprises displaying at least one first source image on the user interface simultaneously with the composite image, the at least one first source image containing at least one pixel in a first area of interest;
comparing the one or more source images to the composite image;
indicating on the 3D composite image one or more boundaries of the at least one first source image;
automatically highlighting, based on the comparing, the area of interest within a portion of the displayed source image as the one or more source images are displayed on the user interface, wherein a visual difference exists between the area of interest as presented in the composite image and the area of interest as presented in the one or more source images;
analyzing the area of interest to determine if damage is present on the gas turbine engine component as shown by the visual difference; and
based upon the analyzing, scheduling and initiating a maintenance operation when damage is present on the gas turbine engine component.

17. The method of claim 16, wherein identifying the area of interest comprises recognizing the area of interest based on a second user input to a user input device.

18. The method of claim 16, wherein the first user input is detected through at least one of an optical input device, tactile input device, and a gesture input device.

19. The method of claim 16, identifying and displaying at least two areas of interest onto the at least one source image and the composite image.

20. A non-transitory computer-readable memory comprising instructions that, when executed, cause one or more processors to:
- select an area of interest on a gas turbine engine component;
- receive a plurality of source images, wherein one or more of the plurality of source images visually present the area of interest;
- create a composite image by stitching the plurality of source images of the gas turbine engine component, the composite image including the area of interest which in the composite image has lost detail compared to the same area of interest as presented in the one or more of the plurality of source images;
- display the composite image on a user interface;
- highlight the area of interest on the composite image as the composite image is displayed on the user interface;
- display the one or more source images to visually present the area of interest on the user interface simultaneously with the composite image;
- compare the one or more source images to the composite image;
- highlight, based on the comparison, the area of interest within a portion of the displayed source image as the one or more source images are displayed on the user interface, wherein a visual difference exists between the area of interest as presented in the composite image and the area of interest as presented in the one or more source images;
- analyze the area of interest to determine if damage is present on the gas turbine engine component as shown by the visual difference; and
- based upon the analyzing, a maintenance operation is scheduled and initiated when damage is present on the gas turbine engine component.

* * * * *